US012655662B2

(12) United States Patent
Suk et al.

(10) Patent No.: US 12,655,662 B2
(45) Date of Patent: Jun. 16, 2026

(54) MOTOR VEHICLE LOCK

(71) Applicant: KIEKERT AG, Heiligenhaus (DE)

(72) Inventors: Jan Suk, Pardubice (CZ); Aleš Kejdana, Přelouč (CZ)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 78 days.

(21) Appl. No.: 18/579,552

(22) PCT Filed: Jul. 19, 2022

(86) PCT No.: PCT/DE2022/100519

§ 371 (c)(1),
(2) Date: Jan. 16, 2024

(87) PCT Pub. No.: WO2023/006145

PCT Pub. Date: Feb. 2, 2023

(65) Prior Publication Data

US 2024/0337139 A1 Oct. 10, 2024

(30) Foreign Application Priority Data

Jul. 28, 2021 (DE) ..................... 10 2021 119 635.3

(51) Int. Cl.
*E05B 83/24* (2014.01)

(52) U.S. Cl.
CPC .................................... *E05B 83/24* (2013.01)

(58) Field of Classification Search
CPC ......... E05B 83/16; E05B 83/24; E05B 83/247
See application file for complete search history.

(56) References Cited

U.S. PATENT DOCUMENTS 5,738,393 A 4/1998 Chao
5,853,060 A 12/1998 Chao
(Continued)

FOREIGN PATENT DOCUMENTS

CN 117449713 A * 1/2024
DE 3337202 A1 4/1985
(Continued)

OTHER PUBLICATIONS

Computer Generated Translation for DE 102009010975 A1, Generated on Dec. 1, 2025, https://worldwide.espacenet.com/patent/ (Year: 2025).*

(Continued)

*Primary Examiner* — Alyson M Merlino
(74) *Attorney, Agent, or Firm* — Renner, Otto, Boisselle & Sklar, LLP

(57) ABSTRACT

A bonnet lock comprising: a locking mechanism having a catch and at least one pawl; a lock holder; and a release lever; wherein the locked locking mechanism can be unlocked by means of the release lever, and wherein the lock holder can be transferred from a latching position into a support position after the release lever is actuated for a first time and the lock holder can be held in the support position by means of a safety catch, and the lock holder can be transferred into a release position after the release lever is actuated for a second time, wherein the safety catch can be pivoted in the latching position such that the safety catch can be pivoted into a lowered position with respect to a support position.

9 Claims, 2 Drawing Sheets

(56) References Cited

U.S. PATENT DOCUMENTS

| | | | | |
|---|---|---|---|---|
| 10,590,683 | B2 * | 3/2020 | Cumbo | E05B 83/24 |
| 10,697,209 | B2 * | 6/2020 | Kim | E05B 83/24 |
| 11,015,375 | B2 * | 5/2021 | Lebsak | E05B 83/24 |
| 11,168,498 | B2 * | 11/2021 | Distefano | E05B 83/24 |
| 11,859,416 | B2 * | 1/2024 | Johann | E05B 81/14 |
| 2012/0161456 | A1 * | 6/2012 | Riedmayr | E05B 83/24<br>292/226 |
| 2018/0030763 | A1 * | 2/2018 | Distefano | E05B 83/24 |
| 2018/0073283 | A1 * | 3/2018 | Kim | E05B 83/24 |
| 2021/0404224 | A1 * | 12/2021 | Miyake | E05B 83/243 |

FOREIGN PATENT DOCUMENTS

| | | | | | |
|---|---|---|---|---|---|
| DE | 19804066 | A1 | | 8/1998 | |
| DE | 102007003292 | A1 | | 7/2008 | |
| DE | 102007008700 | A1 | | 8/2008 | |
| DE | 102009010975 | A1 | * | 9/2010 | E05B 81/14 |
| DE | 102009034904 | A1 | * | 2/2011 | E05B 83/16 |
| DE | 102010062700 | A1 | | 6/2012 | |
| DE | 102011114148 | A1 | | 3/2013 | |
| DE | 102016210596 | A1 | * | 12/2016 | E05B 77/08 |
| DE | 102016121627 | A1 | | 10/2017 | |
| DE | 102018119662 | A1 | | 2/2019 | |
| DE | 102017218021 | A1 | | 4/2019 | |
| KR | 20130019686 | A | | 2/2013 | |
| KR | 20170119013 | A | * | 10/2017 | |
| KR | 20180076221 | A | * | 7/2018 | |

OTHER PUBLICATIONS

International Search Report mailed Oct. 26, 2022, for priority International Application No. PCT/DE2022/100519.

* cited by examiner

MOTOR VEHICLE LOCK

This application is a national phase of International Patent Application No. PCT/DE2022/100519 filed Jul. 19, 2022, which claims priority to German Patent Application No. 10 2021 119 635.3 filed Jul. 28, 2021, each of which is hereby incorporated herein by reference in its entirety.

FIELD OF DISCLOSURE

The invention relates to a lock for a motor vehicle, in particular a hood lock, comprising a locking mechanism having a rotary latch and at least one pawl, a lock holder, a release lever, wherein the locking mechanism can be unlocked by means of the release lever, and wherein the lock holder can be transferred from a latching position into a support position after a first actuation, and the lock holder can be held in the support position by means of a catch hook, and the lock holder can be transferred into a release position after the release lever has been actuated for a second time.

BACKGROUND OF DISCLOSURE

Locks for motor vehicles are used where components arranged pivotally or displaceably on the motor vehicle have to be secured in their position. In this case, the locks which, in addition to simply securing the position of the movable component, must additionally contain a safety measure are of particular importance. For example, side doors are provided with a pre-latch and a main latch in order to protect the occupants in any event, even if the side door element has not been completely closed. In particular in the front region of the motor vehicle, high wind forces may act on a hood when driving the motor vehicle. In this case, a catch hook is additionally used in addition to the actual locking mechanism of the lock. If, for example, the motor vehicle lock and in particular the locking mechanism are unintentionally opened while driving, the hood can still be secured by means of a catch hook in order to prevent the hood from completely opening.

Even though it is still currently customary for the catch hook to be manually moved out of the engagement region of the lock holder cooperating with the lock, solutions have already become known in which direct engagement on the catch hook can be dispensed with. A locking device in which the catch hook is manually pivoted by means of a grip in order to transfer the catch hook into a release position has become known, for example, from DE 198 04 066 A1.

A motor vehicle lock in which a hood lock can be opened by pulling a grip twice has become known, for example, from U.S. Pat. No. 5,738,393. The grip is connected via a cable pull to a pawl, referred to here as a lever. By means of a first actuation of the grip, the pawl is taken out of engagement with a rotary latch, referred to here as a primary lock element, so that a lock holder can be transferred into a first support position. In the support position, the lock holder is secured in position by a catch hook. Only after a second actuation of the grip does the lock holder reach a release position so that the hood can be opened.

DE 10 2007 003 292 A1 discloses an engine hood lock which is referred to here as a locking device. The generic prior art discloses a locking mechanism having a rotary latch and a pawl and an unlocking lever with which the pawl can be taken out of engagement with the rotary latch. A grip arranged in the interior of the motor vehicle is connected to the unlocking lever via a Bowden cable so that the pawl can be moved out of engagement with the rotary latch during a first actuation of the unlocking lever. After the first actuation, i.e. the locking mechanism has been unlocked, the lock holder comes into engagement with a catch hook, wherein the catch hook is held in the catch position by means of a tilting spring, here referred to as an over center spring. Only after a second actuation of the unlocking lever is the catch hook transferred into a release position, wherein the catch hook is in turn held in the release position by means of the tilting spring. The motor vehicle lock can consequently be opened by pulling twice on the grip. For this purpose, the grip is moved two times in different ways or in different directions to enable safe opening of the hood lock.

The solutions known from the prior art for remotely opening a hood lock can function in principle, but then reach their limits if not enough installation space is available, or the movement of an internal operating handle in different ways to open the locking mechanism appears too unsafe. This is where the invention starts from.

SUMMARY OF DISCLOSURE

The object of the invention is to specify an improved motor vehicle lock having the features of the preamble of claim 1. In addition, the object of the invention is to provide a motor vehicle lock which requires less installation space and in which the same actuation paths must always be exceeded to open the motor vehicle lock. Furthermore, the object of the invention is that of providing a structurally simple and inexpensive solution.

The object is achieved by the features of independent claim 1. Advantageous embodiments of the invention are specified in the dependent claims. It should be noted that the embodiments described below are not limiting; rather, any possible variations of the features described in the description and the dependent claims are possible.

According to claim 1, the object of the invention is achieved in that a lock for a motor vehicle, in particular a hood lock, is provided, having a locking mechanism with a rotary latch and at least one pawl, a lock holder cooperating with the locking mechanism, a release lever, wherein the locked locking mechanism can be unlocked by means of the release lever, and wherein the lock holder can be transferred from a latching position into a support position after a first actuation, and the lock holder can be held in the support position by means of a catch hook, and the lock holder can be transferred into a release position after the second time the release lever has been actuated, wherein the catch hook can be pivoted in the latching position, in particular a main latching position, in such a way that the catch hook can be pivoted with respect to a support position into a lowered position.

The design of the hood lock according to the invention now makes it possible to pivot the catch hook out of the movement region of the lock holder. In particular, it can be pivoted out in such a way that the lock holder and thus the engine hood can approach the motor vehicle lock. The catch hook preferably protrudes beyond an upper end of the motor vehicle lock so that the movement of the lock holder and accordingly the hood is limited. In the past, this was particularly advantageous because a grip was provided on the catch hook by which the operator could manually release the catch hook from the engagement region with the lock holder. Given the possibility of internally actuating the motor vehicle lock and twice actuating the motor vehicle lock and the associated complete release of the lock holder, the grip on the catch hook can be dispensed with. The invention now shows that by pivoting the catch hook into a lowered position, the lock holder can be shortened or the hood can be moved closer to the motor vehicle lock. This has decisive advantages regarding the construction and design of the motor vehicle. On the one hand, the installation space required for the motor vehicle lock can be reduced, and there are also structural and design advantages with respect to the design of the front region of the motor vehicle. The more compact design of the motor vehicle lock together with the lock holder makes it possible to design the front region of the motor vehicle more compact overall.

The lock is preferably used for a hood, in particular an engine hood. However, the design of the lock according to the invention can also be used wherever a catch hook is used in a lock. This can be covers, for example for a convertible top, flaps for trunk spaces or compartments, to name a few fields of use only by way of example. Catch hooks are used where external influences can cause the hood to open by itself. The use of the catch hook in a hood in the front region of a motor vehicle is preferred. After unlocking the locking mechanism, the locking mechanism releases the lock holder so that a hood may be opened. For example, if the locking mechanism is unintentionally opened while driving the motor vehicle, the wind could completely open the hood. In order to avert any risk for the operator of the motor vehicle or the occupants, the lock holder is held by the catch hook, and at least one further action is necessary in order to completely open the hood.

The locking mechanism comprises a rotary latch and at least one pawl, wherein the rotary latch can be brought into engagement with the lock holder, and the pawl locks the rotary latch in the latching position during closing. In this case, locking mechanisms with a pre-latch and a main latch or only with a main latch are used. The main latching position of the locking mechanism defines the closed position of the engine hood for proper operation of the motor vehicle. If the locking mechanism is unlocked, for example by means of an internal operating handle in the passenger compartment and via a Bowden cable which is in engagement with the hood lock, the lock holder moves into a release position or a pre-latching position. In the pre-latching position, the catch hook holds the lock holder and at least one further manual or electrical actuation is necessary in order to release the catch hook from engagement with the lock holder. A maximum level of safety in the motor vehicle is thus provided.

When the hood or engine hood is closed, the lock holder comes into engagement with the locking mechanism. When the engine hood is completely closed, the lock holder is preferably transferred into a latching position of the locking mechanism in which the pawl latches the rotary latch in a latching position. This latching position can also be referred to as a main latching position. The release lever interacts with the locking mechanism in such a way that the locking mechanism can be unlocked, and the rotary latch releases the lock holder. The release lever is preferably connected indirectly or directly to an internal actuator in the passenger compartment by means of a Bowden cable. An indirect connection to the internal actuating lever can exist, for example, when two hood locks secure the hood in its position on the motor vehicle. The Bowden cable can then be connected to the internal actuating lever via, for example, a switch. The internal actuating lever is able to actuate both motor vehicle locks via the switch.

If the motor vehicle lock is in a latching position, i.e. the hood is completely closed, then the release lever can be pivoted with a first actuation of the internal actuating lever. Pivoting or actuating the release lever causes the locking mechanism to be unlocked, and the lock holder can be transferred from the latching position into a support position. A support position is defined by the fact that the hood is held in an open position, but at the same time the hood is prevented from opening completely. In this case, the prevention of complete opening is prevented by the catch hook. The support position is characterized in that the engine hood is in an open position in which the engine hood is already slightly open. A spring force on the lock holder and/or in the motor vehicle lock holds the engine hood in the support position, wherein the catch hook prevents complete opening. This ensures that the hood can inadvertently open when the internal actuating lever is inadvertently opened or actuated. Unintentional opening, for example while driving the motor vehicle, poses a risk in that wind forces could completely open the engine hood.

If the internal actuating lever is now actuated a second time in the support position, the release lever is again actuated, and the catch hook is moved out of the engagement region with the lock holder. The lock holder accordingly assumes a release position so that the hood can now be opened. The structural design of the catch hook and the interaction with the lock holder ensure that the lock holder is forcibly transferred into the support position, i.e., a pre-latching position. Safe opening and reaching of the support position in the pre-latching position can thus be ensured.

The release lever and the pawl are advantageously mounted on a common shaft. The more compact design of the lock can be increased in that the release lever and the pawl are collectively mounted on a shaft. This results in short actuating paths between the release lever and the pawl which are reflected in short reaction times on the internal actuating lever when the motor vehicle lock is actuated.

In a further advantageous way, the release lever and the pawl can be integrally formed. An integral design offers the advantage of a very compact design of the hood lock. Furthermore, the movement of the release lever can be introduced directly into the locking mechanism so that tolerances are ruled out and longevity of the motor vehicle lock can be ensured. In particular in conjunction with a Bowden cable, tolerances can be set over the service life of the motor vehicle lock which must be taken into account when designing the motor vehicle lock. By directly integrally forming the release lever and pawl, these tolerances can be eliminated in the tolerance chain of the actuation of the vehicle lock. In addition, forces can be optimally transferred from the internal actuating lever to the pawl.

In a variant according to the invention, the release lever can be brought into engagement with the catch hook during a second actuation. The structural design of the motor vehicle lock makes it possible for the release lever to be brought into direct engagement with the catch hook. The catch hook can advantageously be actuated with a steady movement of the release lever. In other words, during a first actuation and a second actuation, the release lever sweeps over the same path. This is advantageous in particular in that the internal actuating lever only ever has to perform one movement which is, in turn, advantageous for the operator since an identical movement is required for unlocking as well as for releasing the lock holder.

After a first actuation of the release lever, the lock holder is transferred from a latching position into a support position or pre-latching position. In this case, the catch hook pivots into the support position which enables secure catching and holding of the lock holder. The pivoting movement of the catch hook from the lowered position in the main latch of the lock toward the support position or pre-latching position of the catch hook simultaneously causes the catch hook to move into the operating region of the release lever by means of an actuating end. Both unlatching the locking mechanism and also releasing the catch hook can thus advantageously take place with a corresponding movement of the release lever. The catch hook assuming the support position therefore results in the catch hook being directly actuable by the release lever.

In order to achieve a further advantageous variant of the invention, a control lever can be actuated by means of the release lever, wherein a movement of the release lever can be controlled by means of the control lever. When the locking mechanism is unlocked, the release lever interacts directly with the pawl and allows the lock holder to slide into the support position. The catch hook is forcibly guided by means of the lock holder so that the catch hook moves into its pre-latching position or support position. In order to enable secure lifting of the pawl and to keep the pawl out of engagement with the rotary latch, the rotary latch has an extension by means of which the control lever can be actuated. The control lever is preferably connected to the release lever in a rotationally fixed manner. In an advantageous variant, the control lever is fixedly connected to the release lever and the pawl. It is also conceivable for the release lever, pawl and control lever to be formed integrally and mounted on a common shaft.

Furthermore, the control lever can be brought into engagement with the rotary latch, wherein latching of the pawl into the rotary latch can be controlled by means of the control lever. The control lever can accordingly be referred to as a snow load lever. A snow load function denotes the function in which, after the locking mechanism has been unlocked, the lock holder does not move out of the latching position when, for example, an excessive load acts on the hood. An excessive load can be generated, for example, by a snow load. Once deflected, the pawl is kept out of engagement with the rotary latch by means of the control lever in this case. Repeated engagement of the pawl in the rotary latch can accordingly be prevented.

In an advantageous development of the invention, a positioner is provided, wherein positioning of the lock holder can be assisted and/or enabled by means of the positioner. In an advantageous variant, a positioner can be arranged on a pivot shaft of the rotary latch. The positioner interacts with a spring, preferably a tension spring, and is able to transfer the unlatched lock holder into an opening movement and in particular into the support position. The forced guidance of the catch hook by the control contour on the catch hook moves the catch hook into the pre-latching position and prevents the hood from opening fully. The positioning movement can be supported by means of the positioner so that a positioning movement, i.e. a movement of the hood into the support position, can be performed by the positioner. The hood or the lock holder can accordingly be transferred into the support position by means of the positioner. The positioner can be designed to be two-armed and have a lifting arm or positioning arm and a spring arm. The lock holder can be guided by means of the positioning arm, and the spring arm can be used to connect the tension spring, which is designed as a coil spring, for example. In an advantageous way, the coil spring can be mounted at one end on the spring arm and at another end on a shaft of the catch hook. By the combined use of the shafts in the motor vehicle lock, a compact and lightweight design of a motor vehicle lock can be provided. The shaft for pivoting the catch hook can thus simultaneously serve as a receptacle for a spring element of the catch hook and the spring element for the positioner. The shaft for the pawl can simultaneously serve as a shaft for the release lever and control lever and, furthermore, the pivot shaft of the rotary latch can be used to receive the loader. Accordingly, not only can a compact design be provided with respect to the dimensions of the motor vehicle lock, but a highly functional lock for two-stroke actuation of a hood lock is also provided with a minimum number of components.

BRIEF DESCRIPTION OF DRAWINGS

The invention is explained in more detail below with reference to the accompanying drawings on the basis of a preferred embodiment. However, the principle applies that the exemplary embodiment does not limit the invention, but merely represents one embodiment. The features shown can be implemented individually or in combination with further features of the description as well as the claims—individually or in combination.

In the figures.

DETAILED DESCRIPTION

Figure 1:
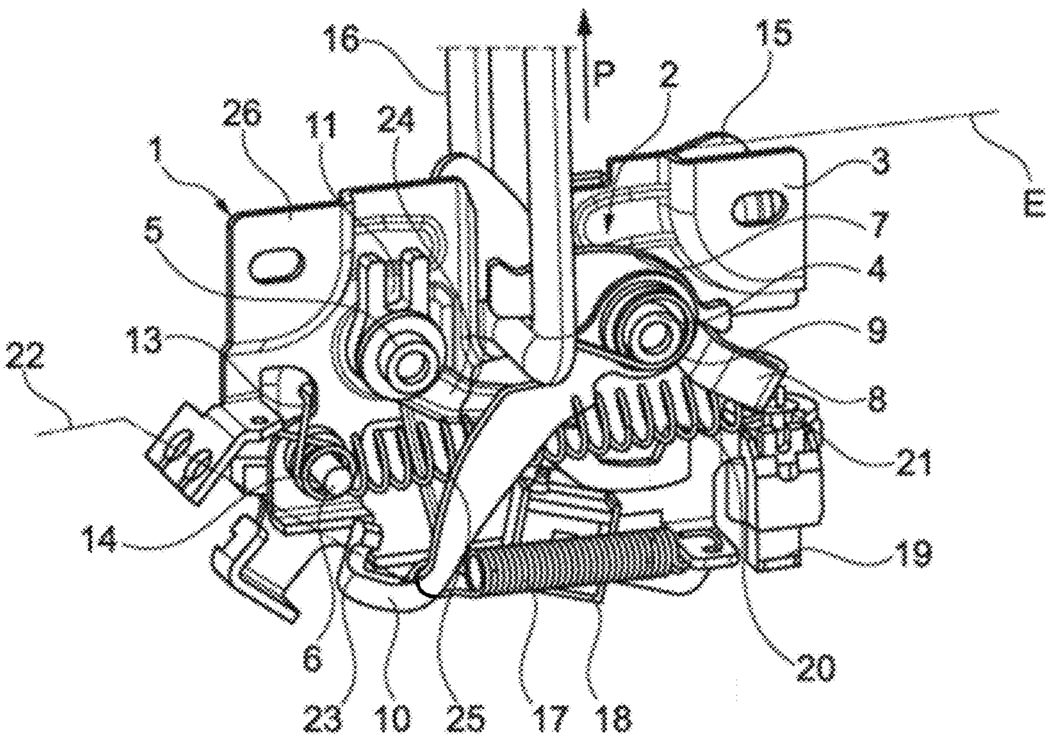
FIG. 1 shows a three-dimensional view of a motor vehicle lock equipped according to the invention, and in particular a hood lock in a latching position of the lock holder, i.e. with a closed hood.

FIG. 1 depicts a hood lock 1 in a latching position of a locking mechanism 2. FIG. 1 shows a plan view of a lock plate 3 and shafts 4, 5, 6 mounted in the lock plate. The shafts 4, 5, 6 each serve to accommodate a plurality of components of the motor vehicle lock 1. The rotary latch 7 and the positioner 8, as well as a rotary latch spring 9, are accommodated on the shaft 4. The shaft 5 carries the release lever 10, the pawl 11 and the control lever. The catch hook spring 13, the positioning spring 14, and the catch hook 15 are accommodated on the shaft 6. The lock holder 16 engages with the rotary latch 7 and the catch hook 15, wherein the lock holder 16 is shown in a main latching position.

A coil spring 17, which acts between the lock plate 3 and the release lever 10, can also be seen. The coil spring 17 is designed in particular as a tension spring. To detect the rotary latch position, a switching means in the form of a microswitch 18 is additionally arranged in the motor vehicle lock 1. The switching means 18 can be electrically contacted via a connection plug 19 so that the hood lock 1 can be connected to the on-board electronics of the motor vehicle. A further coil spring 21, which is also designed as a tension spring, acts on the positioner 8 and between a spring arm 21 of the positioner 8 and the shaft 6. A tensile force can be introduced into the positioner 8 by means of the coil spring 20, whereby a lifting movement can be introduced in the direction of the arrow P into the lock holder 16 and thus the hood.

A dot-dash line 22 indicates that a Bowden cable can be connected to the lock plate 3, wherein the Bowden cable core can be mounted in a recess 23 of the release lever 10. The release lever 10 is shown in its starting position in which the pawl 11 holds the rotary latch 7 in the latching position shown in FIG. 1. For this purpose, the pawl 11 has a latching surface 24 which is in engagement with the rotary latch 7 and fixes or holds the lock holder 16 in the latching position.

The lock holder 16 is in engagement with the rotary latch 7 on the one hand and rests against a positioning contour 25 of the positioner 8. In addition, the catch hook 15 is in engagement with the catch hook 15 in a control contour, wherein the catch hook 15 can be transferred to a lowered position by means of the control contour and under the effect of the movement of the lock holder 16. As can clearly be seen in FIG. 1, the catch hook 15 is substantially flush with a plane E of the upper end of the hood lock 1. This creates the possibility of bringing the lock holder 16 and thus the hood very close to the hood lock 1, which yields structural and design advantages in the motor vehicle.

The positioner 8 is biased clockwise by means of the coil spring 20. The rotary latch spring 9 also biases the rotary latch 7 in a clockwise direction. By means of the coil spring 17, the release lever 10 is tensioned in the counterclockwise direction, and the catch hook 15 is also biased counterclockwise in the motor vehicle lock 1 by means of the spring element 13.

Figure 2:
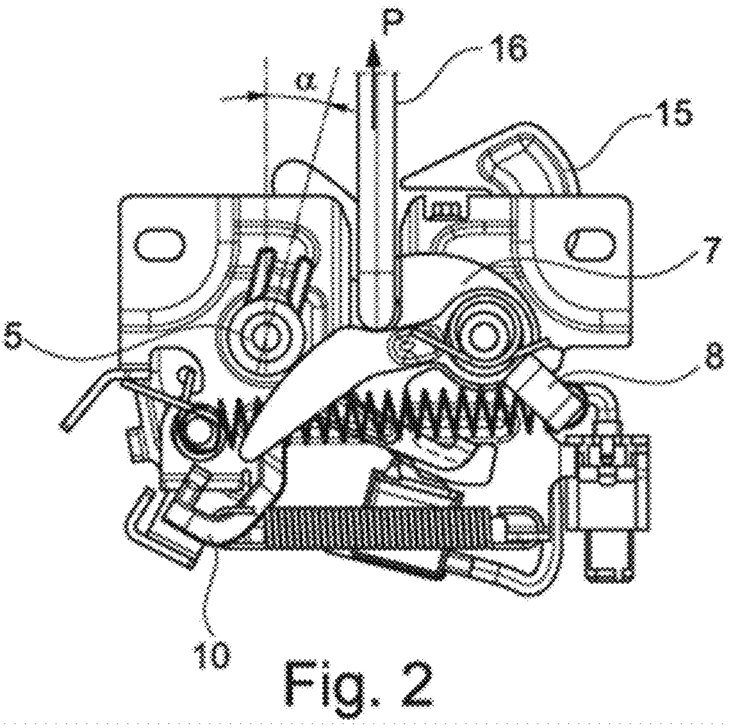
FIG. 2 shows a front view of the hood lock according to FIG. 1 in an unlocked position of the locking mechanism.

If the release lever 10 is now actuated for the first time by means of the Bowden cable 22, starting from FIG. 1 which shows the latching position, i.e. the closed position of the hood, the release lever 10 is pivoted clockwise around the shaft 5 by the angle α. The first time the release lever 10 is pivoted results in the pawl 11 and in particular the latching surface 24 of the pawl 11 coming out of engagement with the rotary latch 7. The rotary latch is released and is pivoted clockwise due to the rotary latch spring 9 and due to the force from the positioner 8. The release of the rotary latch 7 causes the lock holder 16 to move in the direction of the arrow P, whereby the catch hook 15 is moved counterclockwise. In so doing, the catch hook 15 is moved via a control contour in the catch hook 15. FIG. 2 shows the position of the motor vehicle lock 1 in which the release lever 10 was actuated for the first time, and the lock holder 16 moves in the direction of the arrow P. The position of the lock holder 16 is thus depicted in an intermediate position between the latching position and a pre-latching position.

Figure 3:
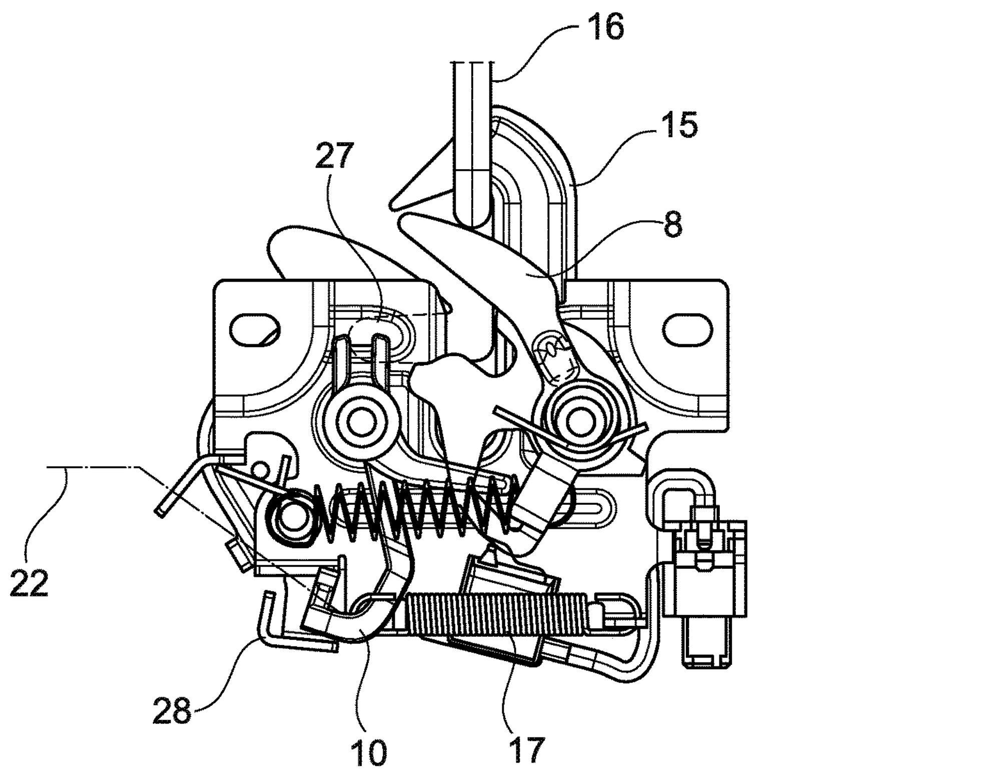
FIG. 3 shows a plan view of the hood lock in a support position or pre-latching position of the lock holder.

FIG. 3 shows the support position of the engine hood or the lock holder, as well as a pre-latching position of the lock holder 16 in the hood lock 1. After release, the lock holder 16 was moved into the support position or pre-latching position by the locking mechanism 2 and with the aid of the positioner 8. A control contour 27 in the catch hook is used to move the catch hook 15, wherein the control contour 27 was indicated in FIG. 3 as a dashed line 27. Due to the movement of the catch hook 15 into the support position, a stop contour on the catch hook 15 was moved into the operating region of the release lever 10. After the first actuation, the release lever 10 is again located in the starting position in which the release lever is held by means of the spiral spring 17.

Figure 4:
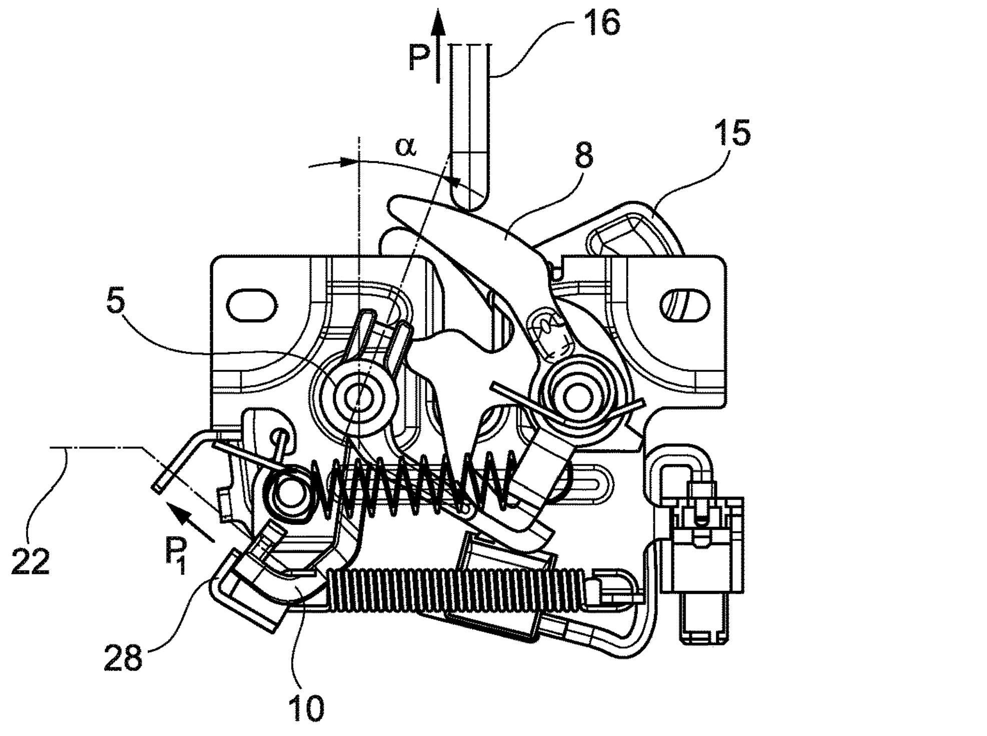
FIG. 4 shows a release position of the hood lock, wherein the positioner has moved the lock holder out of the engagement region with the catch hook.

If, as shown in FIG. 4, the release lever 10 is again pivoted by the angle α around the shaft 5, the release lever 10 arrives at the stop contour 28 of the catch hook, whereby the catch hook 15 is transferred to a release position during a second actuation of the release lever 10. The lock holder 16 is accordingly free, and the hood can be opened. The lock holder 16 is guided by the positioner 8 into the release position so as to ensure secure release from the engagement region of the hood lock 1. The movement of the Bowden cable core of the Bowden cable 22 is shown in principle by the arrow P1 in FIG. 4.

LIST OF REFERENCE NUMBERS

1 Hood lock
2 Locking mechanism
3 Lock plate
4, 5, 6 Shaft
7 Rotary latch
8 Positioner
9 Rotary latch spring
10 Release lever
11 Pawl
13 Catch hook spring
14 Suspension of positioning spring
15 Catch hook
16 Lock holder
17,20 Spiral spring
18 Microswitch
19 Plug
21 Spring arm
22 Bowden cable
23 Recess
24 Latching surface
25 Positioning contour
26 Upper end
27 Control contour
28 Stop contour
P, P1 Arrow
E Plane
α Angle

The invention claimed is:

1. A lock for a motor vehicle, the lock comprising:
a locking mechanism with a rotary latch and a pawl rotatably mounted on a lock plate,
a lock holder,
a release lever, the locking mechanism being unlockable by the release lever, and
a catch hook, wherein the catch hook is biased by a catch hook spring to rotate in a first direction,
the lock holder being transferrable from a release position to a latching position through a movement region of the lock holder, which causes a hook of the catch hook to pivot out of the movement region by rotating the catch hook in a second direction opposite the first direction, wherein the lock holder, when in the latching position, holds the catch hook in a lowered position by pressing on the catch hook such that the hook of the catch hook is substantially flush with a plane of the lock plate,
the lock holder further being transferrable from the latching position to a support position after a first actuation of the release lever which causes the hook of the catch hook to rotate via the bias of the catch hook spring into the movement region of the lock holder to engage the lock holder outside an inlet mouth, and
the lock holder is configured to be held in the support position by direct engagement with the hook of the catch hook, and the lock holder is transferrable into the release position after a second actuation of the release lever.

2. The lock according to claim 1, wherein the release lever unlocks the locking mechanism during the first actuation.

3. The lock according to claim 1, wherein the release lever and the pawl are mounted on a common shaft.

4. The lock according to claim 1, wherein the release lever is brought into engagement with the catch hook during the second actuation.

5. The lock according to claim 1, wherein the catch hook is moved into engagement with the release lever during movement of the locking holder from the latching position to the support position.

6. The lock according to claim 1, further comprising a positioner, wherein the lock holder is positionable by operation of the positioner.

7. The lock according to claim 6, wherein the positioner is mounted on a shaft of the rotary latch.

8. The lock according to claim 6, wherein the positioner has a positioning arm that guides the lock holder and a spring arm for connecting to a tension spring.

9. The lock according to claim 1, wherein the release lever sweeps over a same path during the first actuation and the second actuation.

* * * * *